(12) United States Patent
Finogenov (10) Patent No.: US 8,213,583 B2
(45) Date of Patent: Jul. 3, 2012

(54) SECURE ACCESS TO RESTRICTED RESOURCE

(75) Inventor: Alexander Finogenov, El Dorado Hills, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1426 days.

(21) Appl. No.: 11/562,607

(22) Filed: Nov. 22, 2006

(65) Prior Publication Data
US 2008/0118041 A1 May 22, 2008

(51) Int. Cl.
*H04M 11/00* (2006.01)
(52) U.S. Cl. ............ 379/93.02; 379/142.05; 379/142.06; 379/167.06
(58) Field of Classification Search ............... 379/88.19, 379/88.21, 167.06, 142.05, 142.06, 93.02
See application file for complete search history.

(56) References Cited

U.S. PATENT DOCUMENTS

| 5,636,280 A * | 6/1997 | Kelly ............................. 713/155 |
| 6,993,658 B1 | 1/2006 | Engberg et al. |
| 7,715,823 B2 * | 5/2010 | Bravo et al. ................... 455/411 |
| 7,797,434 B2 * | 9/2010 | Blakley et al. ................ 709/229 |
| 2004/0203595 A1 | 10/2004 | Singhal |
| 2005/0076246 A1 | 4/2005 | Singhal |
| 2007/0016796 A1 * | 1/2007 | Singhal ......................... 713/183 |

OTHER PUBLICATIONS

SecurID, NPL document Sep. 20, 2006.*
SecurID, printed from Wikipedia, Oct. 9, 2006, http://en.wikipedia.org/wili/SecurID.
Hara, et al. VPN Architecture Enabling Users to be Associated with Multiple VPNs. [online], 2004, retrieved on Oct. 7, 2008. Retrieved from the internet: <URL: http://www-imase.ics.es.osaka-u.ac.jp/paper/Hara03_APSITT.pdf>.

* cited by examiner

*Primary Examiner* — Curtis Kuntz
*Assistant Examiner* — Yosef K Laekemariam

(57) ABSTRACT

A system may generate an access number, provide the access number to a user via a telephone call, and provide the access number to an authentication server. The system may regulate access by the user to a restricted resource based on the access number provided to the user and the access number provided to the authentication server.

26 Claims, 8 Drawing Sheets

SECURE ACCESS TO RESTRICTED RESOURCE

BACKGROUND

Many companies use secure devices, like token devices, to regulate access to their restricted resources. A company issues token devices to its employees and/or customers. The token devices generate numbers that change over time (e.g., every 1 minute). The company's server also generates numbers that track the numbers generated by the token devices. The numbers generated by the company's server are synchronized in time with the numbers generated by the token devices.

When a user attempts to gain access to a restricted resource of the company, the user provides the number currently shown on his token device to the company's server and a personal identification number (PIN). The company's server regulates access to the restricted resource based on the user-provided number matching the number it generated, and the user's PIN.

Token devices are expensive. While each token device alone may not be that expensive, it becomes expensive when purchasing token devices for all of a company's employees and/or customers. Also, token devices need to be periodically replaced (e.g., every 3 years). Therefore, token devices become a continuing expense. Further, it becomes impossible for an employee/customer to access the company's restricted resource if the employee/customer loses or forgets his token device.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Figure 1:
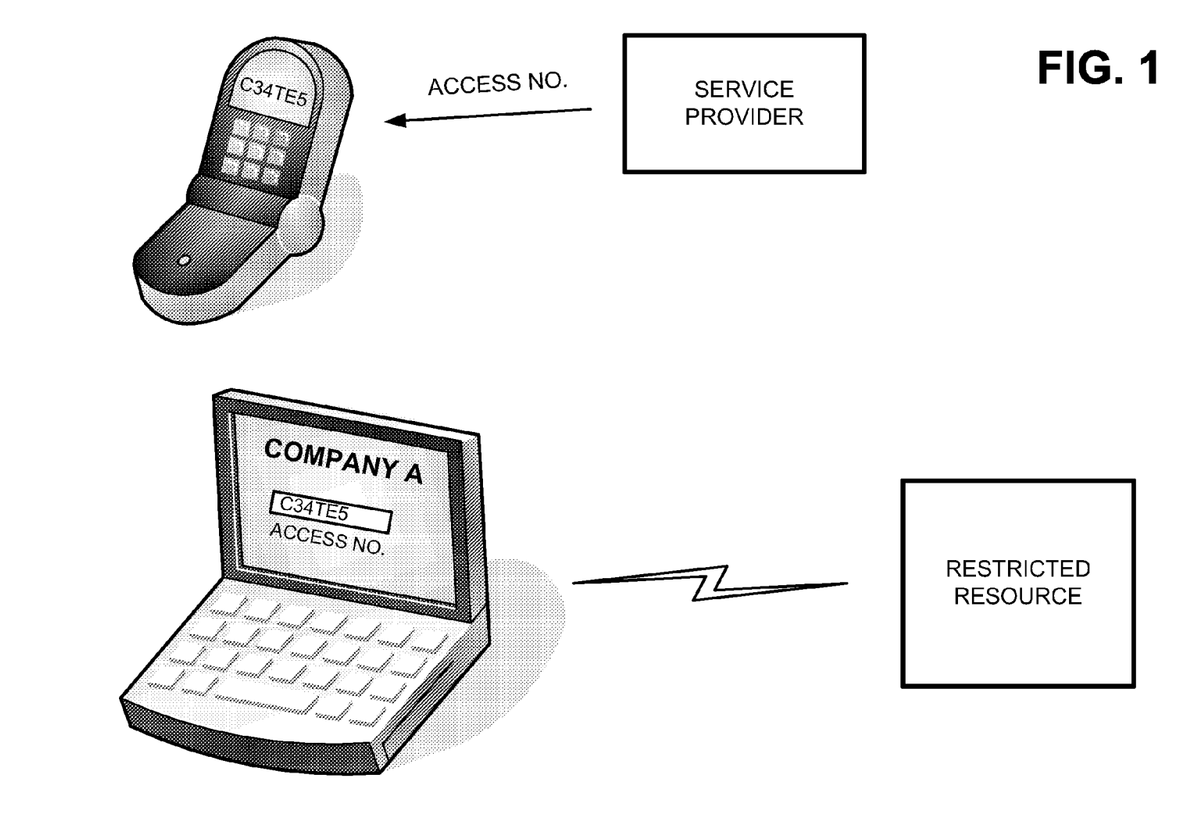
FIG. 1 is an exemplary diagram illustrating a concept described herein.

Implementations described herein may facilitate selective access to a restricted resource. FIG. 1 is an exemplary diagram illustrating a concept described herein. As shown in FIG. 1, a user might use a cellular telephone to contact a service provider. The user may authenticate herself to the service provider using, for example, information identifying the user's cellular telephone (e.g., caller identification (ID)) and possibly a password (e.g., any combination of letters, numbers, and/or symbols). If the user is properly authenticated, the service provider may provide an access number that might be shown on a display of the cellular telephone. The user might enter the access number into a user interface on a computer device that provides access to a restricted resource. The access number may be used to authenticate the user and provide selective access to the restricted resource.

Figure 2:
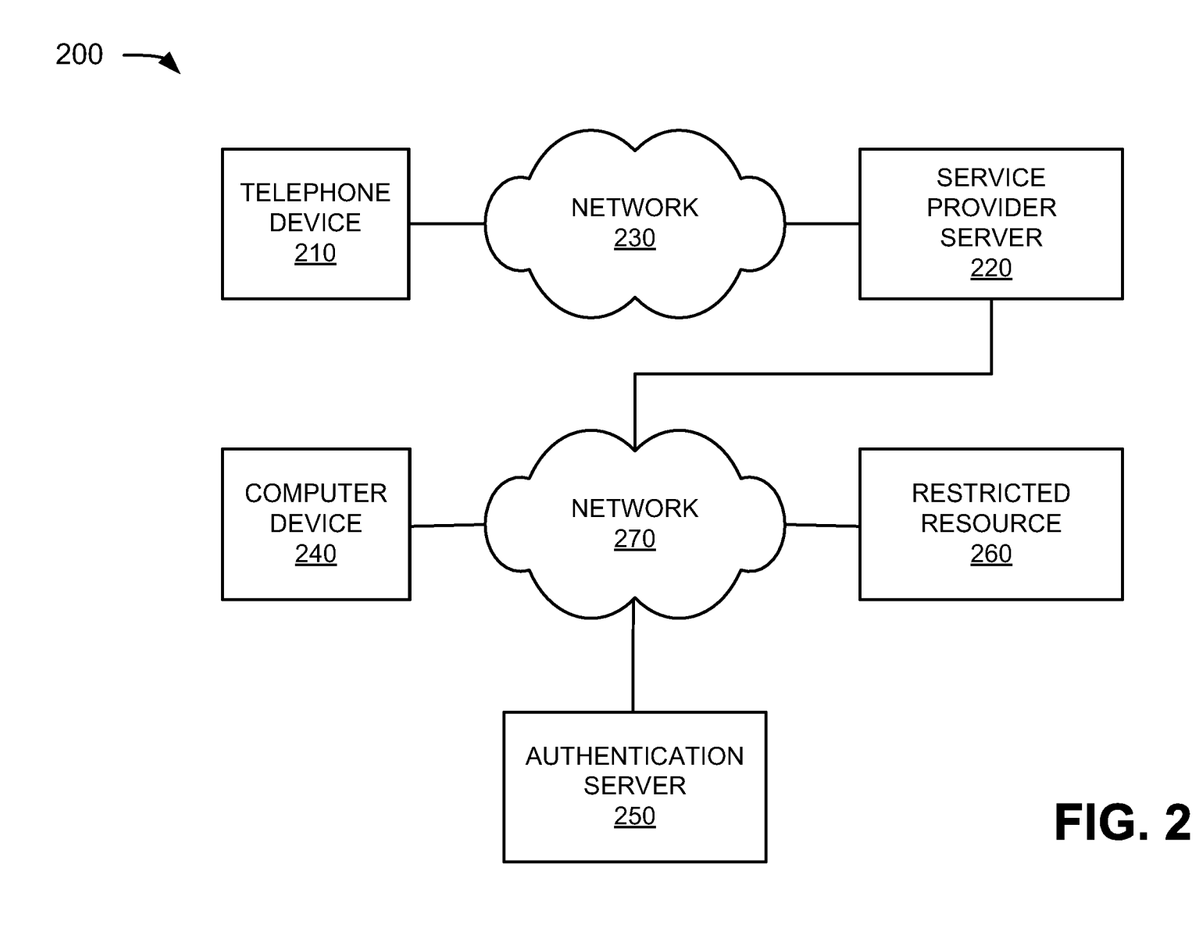
FIG. 2 is an exemplary diagram of a network in which systems and methods described herein may be implemented.

FIG. 2 is an exemplary diagram of a network 200 in which systems and methods described herein may be implemented. Network 200 may include a telephone device 210 connected to a service provider server 220 via network 230, and a computer device 240 connected to authentication server 250 and restricted resource 260 via network 270. A single telephone device 210, service provider server 220, computer device 240, authentication server 250, and restricted resource 260 have been illustrated as connected to networks 230 and 270 for simplicity. In practice, there may be more or fewer telephone devices, service provider servers, computer devices, authentication servers, and/or restricted resources.

Also, it may be possible for some combination of telephone device 210, service provider server 220, computer device 240, authentication server 250, and/or restricted resource 260 to be implemented within a single device. For example, telephone device 210 and computer device 240 may be implemented as single device, authentication server 250 and restricted resource 260 may be implemented as a single device, and/or computer device 240 and restricted resource 260 may be implemented as a single device.

Telephone device 210 may include any type or form of communication device, such as a cellular telephone, a cordless telephone, a wired telephone, a satellite telephone, a radiotelephone, a smart phone, etc. A user might use telephone device 210 to contact service provider server 220.

Service provider server 220 may include a device, such as a computer system, that is capable of communicating via network 230 and network 270. In one embodiment, service provider server 220 may be implemented as a single device. In another embodiment, service provider server 220 may be implemented as multiple devices that are either co-located or remotely located.

Computer device 240 may include any type or form of computation or communication device, such as a personal computer, a laptop, a personal digital assistant (PDA), etc. A user of computer device 240 may attempt to gain access to restricted resource 260 via authentication server 250. Authentication server 250 may include a device, such as a computer system, that is capable of authenticating a user for selective access to restricted resource 260. In one embodiment, authentication server 250 may permit access to restricted resource 260 based on the access number from service provider server 220. Restricted resource 260 may include any type or form of resource to which access may be controlled, such as a private network (e.g., a company intranet), a device (e.g., a computer, a memory device, or a peripheral), data (e.g., data associated with a user's account or profile), or software (e.g., an email application, a word processing program, or an operating system).

Network 230 may include a telephone network, such as a cellular network, the Public Switched Telephone Network (PSTN), or a combination of networks. Network 270 may include a local area network (LAN), a wide area network (WAN), a telephone network, such as the PSTN or a cellular network, an intranet, the Internet, or a combination of networks. It may be possible for network 230 and network 270 to be implemented as the same network.

Figure 3:
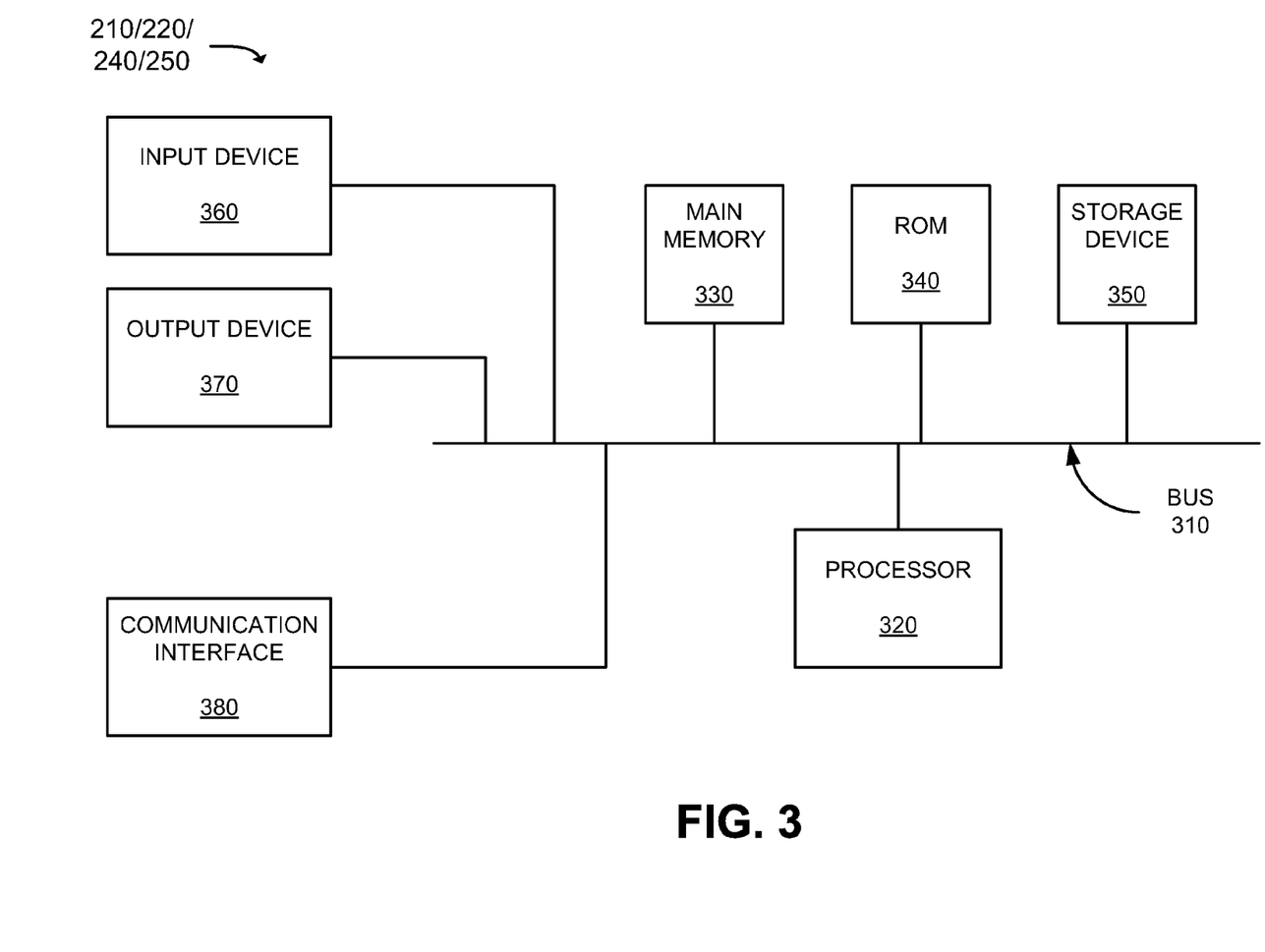
FIG. 3 is an exemplary diagram of a device that may correspond to one or more of the telephone device, service provider server, computer device, and/or authentication server of FIG. 2.

FIG. 3 is an exemplary diagram of a device that may correspond to one or more of telephone device 210, service provider server 220, computer device 240, and/or authentication server 250. The device may include a bus 310, a processor 320, a main memory 330, a read only memory (ROM) 340, a storage device 350, an input device 360, an output device 370, and a communication interface 380. Bus 310 may include a path that permits communication among the elements of the device.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the device, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the device to communicate with other devices and/or systems. For example, communication interface 380 may include mechanisms for communicating with another device or system via a network, such as network 230 or 270.

As will be described in detail below, the device shown in FIG. 3, as described herein, may perform certain operations relating to the obtainment of selective access to restricted resource 260. The device may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Figure 4:
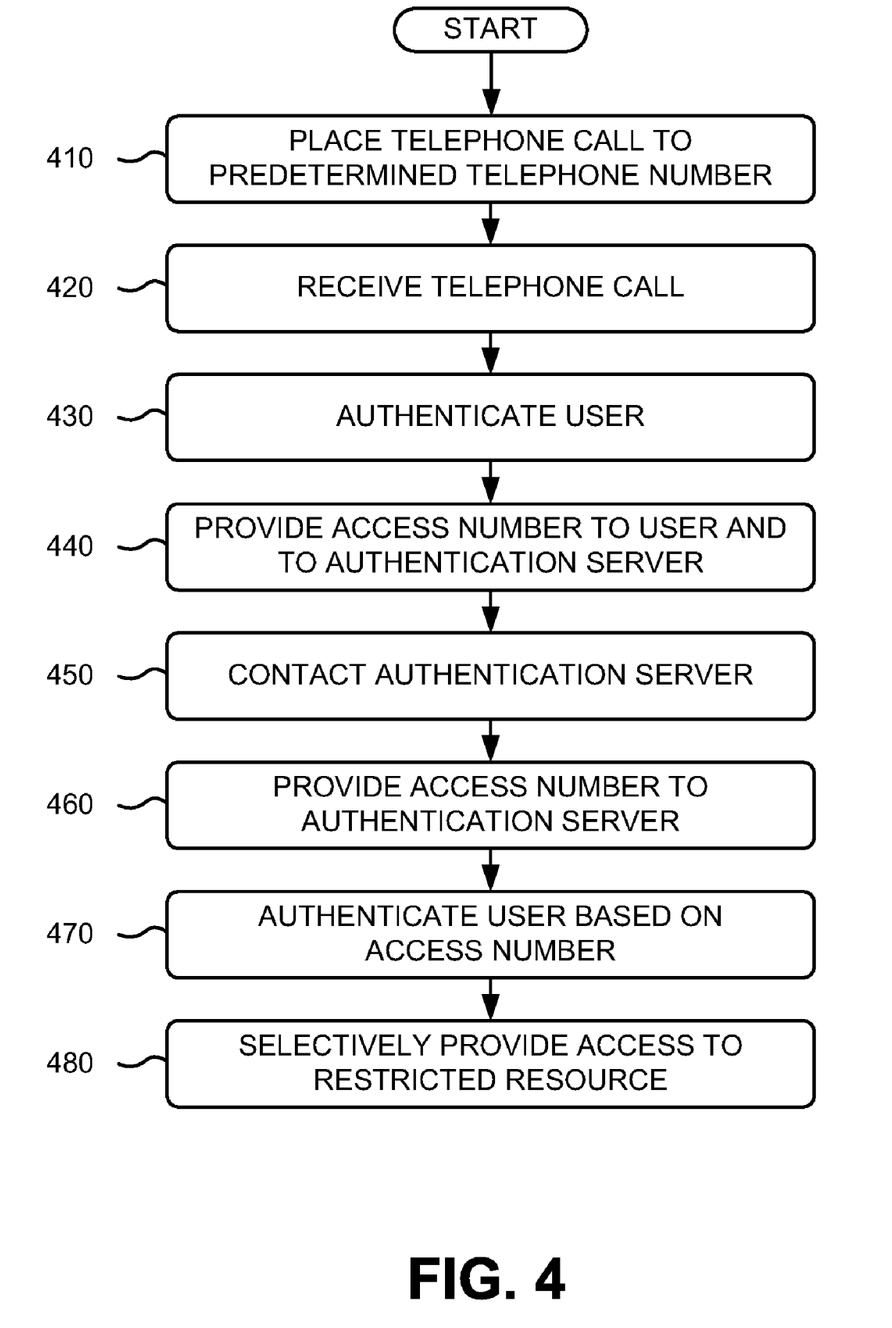
FIG. 4 is a flowchart of an exemplary process for selectively providing access to a restricted resource.
Figure 5A:
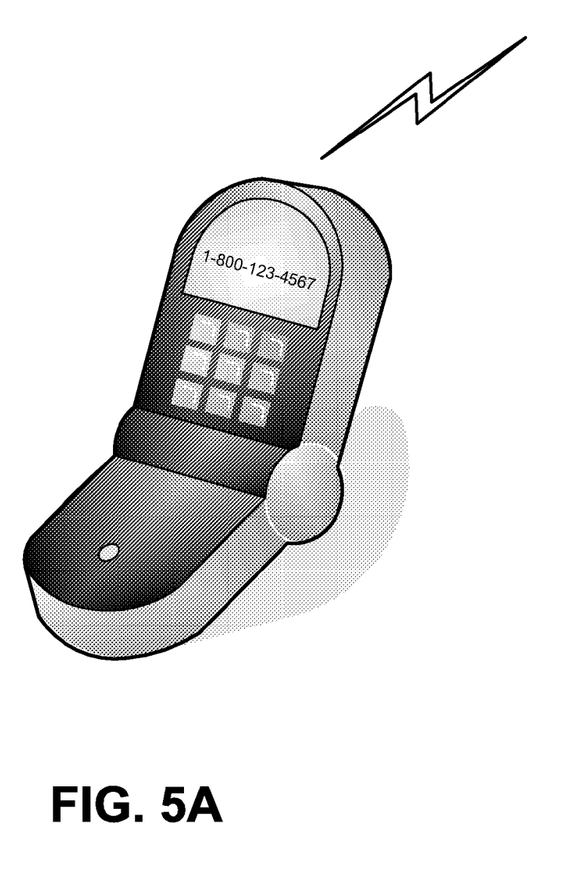
FIGS. 5A-5B are exemplary diagrams of a telephone device that illustrate portions of the process of FIG. 4.
Figure 5B:
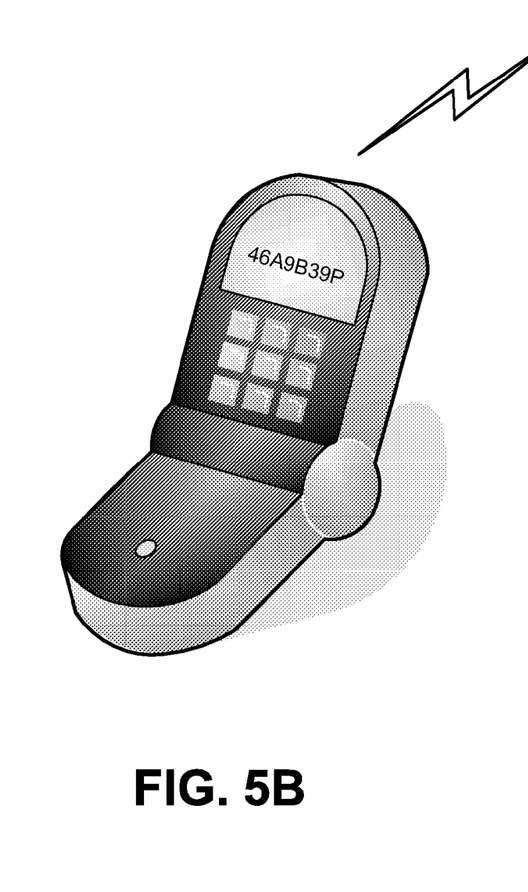
Figure 6:
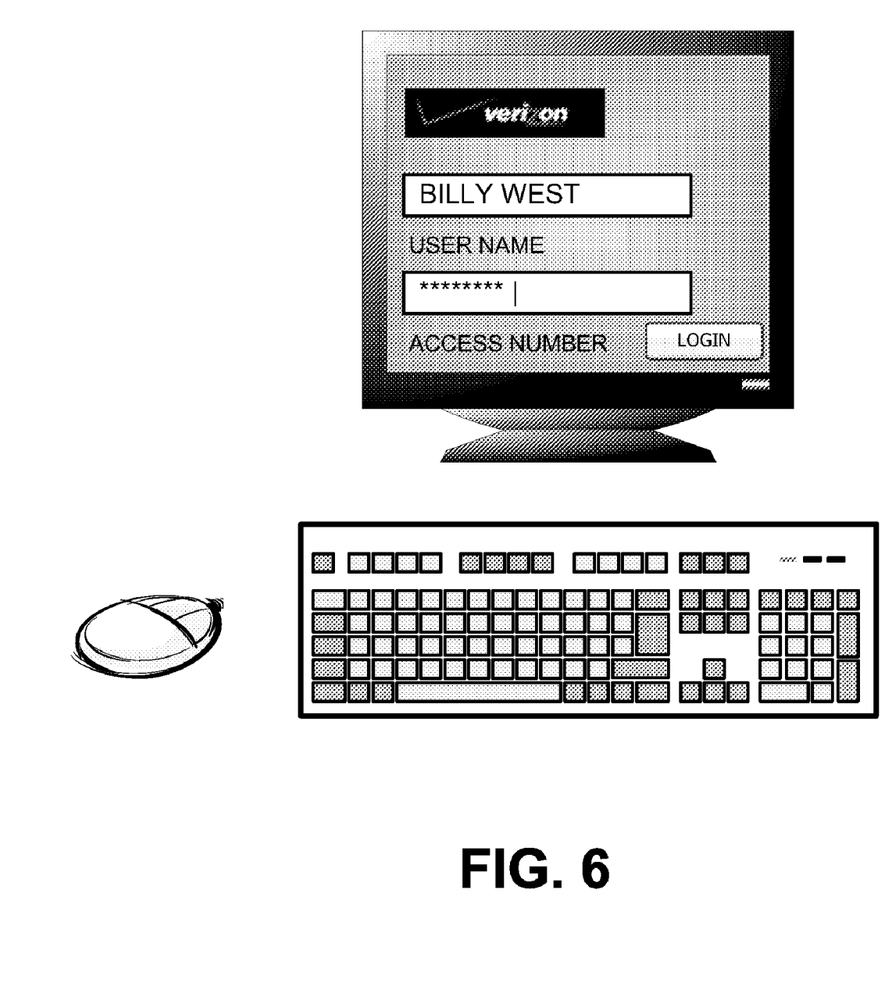
FIG. 6 is an exemplary diagram of a computer device that illustrates portions of the process of FIG. 4.

FIG. 4 is a flowchart of an exemplary process for selectively providing access to a restricted resource. In one implementation, the processing of FIG. 4 may be performed by one or more software and/or hardware components within telephone device 210, service provider server 220, computer device 240, authentication server 250, or a combination of telephone device 210, service provider server 220, computer device 240, and authentication server 250. FIGS. 5A-5B are exemplary diagrams of a telephone device that illustrate portions of the process of FIG. 4. FIG. 6 is an exemplary diagram of a computer device that illustrates portions of the process of FIG. 4.

Processing may begin with a telephone call being placed to a predetermined telephone number (block 410). For example, a user may enter a telephone number associated with service provider server 220 into telephone device 210, as shown in FIG. 5A. When instructed by the user, telephone device 210 may place a call to service provider server 220.

The telephone call may be received and the user may be authenticated (blocks 420 and 430). For example, service provider server 220 may identify the user based on unique telephone identifying information associated with telephone device 210, such as caller ID information, International Mobile Subscriber Identity (IMSI) information, or other information unique to telephone device 210. Service provider server 220 may identify the user of telephone device 210 based on user identifying information particular to the user, such as a password or biometric data (e.g., a voice signal). For example, service provider server 220 may request that the user provide the user identifying information and may compare the user identifying information to identifying information previously associated with telephone device 210. It may be possible for multiple users to be associated with the same telephone device 210. In this case, service provider server 220 may use the user identifying information provided by the user to determine whether the user is one of these users and if so, which one.

If the user is not properly authenticated, then the call may be disconnected. If the user is properly authenticated, however, an access number may be provided to telephone device 210 and authentication server 250 (block 440). For example, service provider server 220 may include a hardware or software access number generator that is configured to generate a random string of characters (e.g., any combination of numbers, letters, and/or symbols) of a predetermined length to be used as an access number. In one implementation, the access number may include the user identifying information (or possibly the telephone identifying information) embedded therein. In this case, a random string of characters may be generated and then this string of characters may be modified to embed the user identifying information. The user identifying information may be embedded in a manner known to authentication server 250, such that authentication server 250 is capable of determining the user identifying information from the access number.

It is beneficial that the access number be generated in a non-predictable manner that is not reproducible (e.g., by hacking). The access number may have a certain expiration time (e.g., 1 minute, 5 minutes, 30 minutes, etc.) that indicates when the access number expires. For security purposes, shorter expiration times may be favored over longer expiration times. Also, the access number may be designed for a one-time use, such that the access number may be immediately expired upon use.

Service provider server 220 may send the access number to telephone device 210. In one implementation, service provider server 220 may send the access number in a message for presentation on a display of telephone device 210, as shown in FIG. 5B. Service provider server 220 may also send the same access number to authentication server 250. In one implementation, service provider server 220 may send the access number in a message along with information regarding the user to authentication server 250. Authentication server 250 may use the user information to match a subsequent access attempt by the user to the message (and, thus, the access number) received from service provider server 220.

At some point, authentication server 250 may be contacted (block 450). For example, the user may access a user interface associated with computer device 240 or authentication server 250, as shown in FIG. 6. In one implementation, the user may access the user interface using, for example, a web browser provided on computer device 240. In another implementation, the user may be presented with the user interface automatically after powering up of computer device 240.

The access number may be presented to authentication server 250 (block 460). For example, authentication server 250 may request various pieces of information to properly authenticate the user. In one implementation, authentication server 250 may authenticate the user based on the user's user name (e.g., Billy West) and the access number (e.g., 46A9B39P), as shown in FIG. 6. If the access number includes the user identifying information (or telephone identifying information) embedded therein, authentication server 250 may authenticate the user based on the user name, the access number, and the user identifying information.

To provide further security, authentication server 250 may authenticate the user based on the user name, the access number, and one or more additional pieces of information, such as a password that is unique to the user, biometric data that is unique to the user, a password that is unique to a group of users (e.g., employees of the same company), an address that is unique to computer device 240 used by the user, or some other information that can uniquely or semi-uniquely identify the user.

The access number may be provided to authentication server 250 in a number of ways. For example, the user might enter the access number using an input device, such as a keyboard. Alternatively, the access number may be transmitted from telephone device 210 to computer device 240 directly or indirectly via a wired or wireless connection.

The user may be authenticated based on the access number (block 470). For example, authentication server 250 may collect information from the user, as described above, and authenticate the user. In one implementation, as described above, authentication server 250 may properly authenticate the user based on the user name and a valid access number. The access number may be considered valid when it matches the access number received from service provider server 220 and the access number is received before it expires. In another implementation, authentication server 250 may use additional information to properly authenticate the user, as described above. Authentication server 250 may immediately expire the access number after use. In this case, if the user were to subsequently attempt to authenticate to authentication server 250 using the same access number, authentication server 250 would not properly authenticate the user because the access number would be identified as invalid.

Selective access to restricted resource 260 may be provided (block 480). For example, if authentication server 250 cannot properly authenticate the user, then authentication server 250 may deny the user access to restricted resource 260. In this case, the user may need to place another call to service provider server 220 to obtain a new access number (e.g., block 410). If authentication server 250 properly authenticates the user, then authentication server 250 may grant the user access to restricted resource 260. In this case, authentication server 250 may send a message to restricted resource 260, or another device that regulates access to restricted resource 260 (e.g., a firewall, a gateway, or the like), to permit access to the user. The user's access to restricted resource 260 may be unlimited (e.g., permit unrestricted access to any part of restricted resource 260) or limited (e.g., permit access to only certain part(s) of restricted resource 260) based on policies associated with restricted resource 260.

In an alternate implementation, the access number provided by service provider server 220 may not include the user identifying information (or telephone identifying information) embedded therein. In this case, authentication server 220 may authenticate the user based on the user name, the access number, and other information unique to the user, such as a password or biometric data.

In yet another implementation, service provider server 220 may authenticate the user based solely on the telephone identifying information. In this case, authentication server 220 may authenticate the user based on the user name, the access number, and other information unique to the user, such as a password or biometric data.

Figure 7:
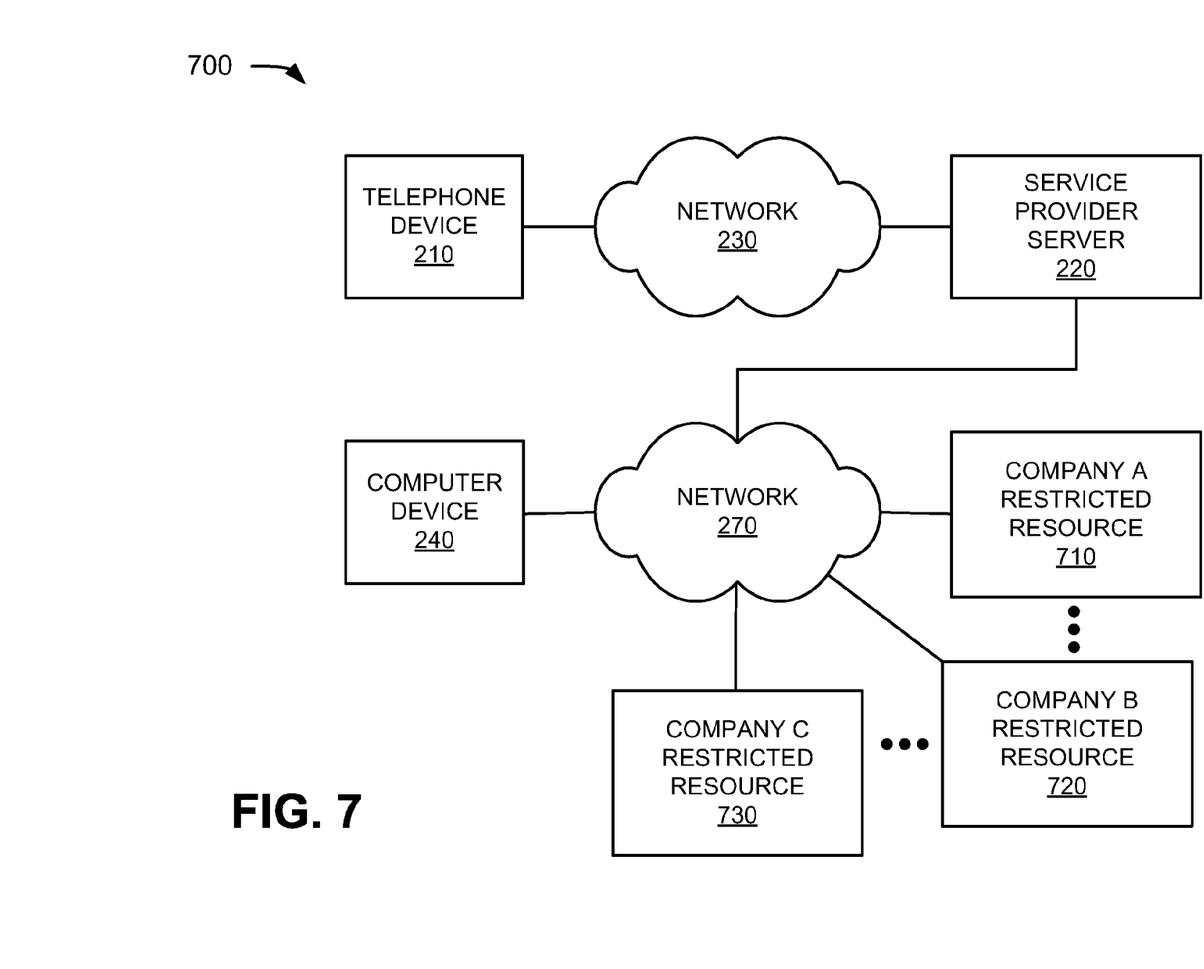
FIG. 7 is an exemplary diagram of another network in which systems and methods described herein may be implemented.

FIG. 7 is an exemplary diagram of another network 700 in which systems and methods described herein may be implemented. Network 700 may include telephone device 210 connected to service provider server 220 via network 230, and computer device 240 connected to restricted resources 710-730 via network 270. Telephone device 210, service provider server 220, network 230, computer device 240, and network 270 may be configured similar to like elements described with regard to FIG. 2.

While no authentication server 250 is shown in FIG. 7, it can be assumed that there is an authentication server for each company or each restricted resource (not shown). Alternatively, the authentication server functionality may be embedded within restricted resources 710-730.

Each of restricted resources 710-730 may be configured similar to restricted resource 260, as described with regard to FIG. 2. While three restricted resources 710-730 are shown in FIG. 7, in practice, there may be more or fewer restricted resources. Assume in network 700, however, that restricted resources 710-730 are associated with different legal entities (e.g., companies). As shown in FIG. 7, restricted resource 710 may be associated with company A, restricted resource 720 may be associated with company B, and restricted resource 730 may be associated with company C. Each of companies A-C may subscribe to authentication services provided by service provider server 220.

In this situation, a user may be selectively provided access to any of restricted resources 710-730 using a process similar to that described above with regard to FIG. 4. As a result, service provider server 220 may be able to cross-authenticate users of one company's restricted resource to another company. This may create a community of companies that trust the same source of authentication (e.g., service provider server 220). This may also permit cross promotion such that company A can promote to company C so that company C's customers can gain quick and secure access to company A's restricted resource(s) using the same authentication procedures that they currently use with company C.

When a user accesses service provider server 220 to obtain an access number, service provider server 220 may determine with which company, or companies, the user is associated. For example, the user may be a customer of both company A and company B. In this case, when service provider server 220 sends the access number to the user, service provider server 220 may also provide the access number to both companies in anticipation of the user attempting to gain access to a restricted resource associated with one of the companies. Alternatively, service provider server 220 may recognize that the user is associated with multiple companies and ask the user to select one of the companies for which the user is going to subsequently attempt to access a restricted resource.

Figure 8:
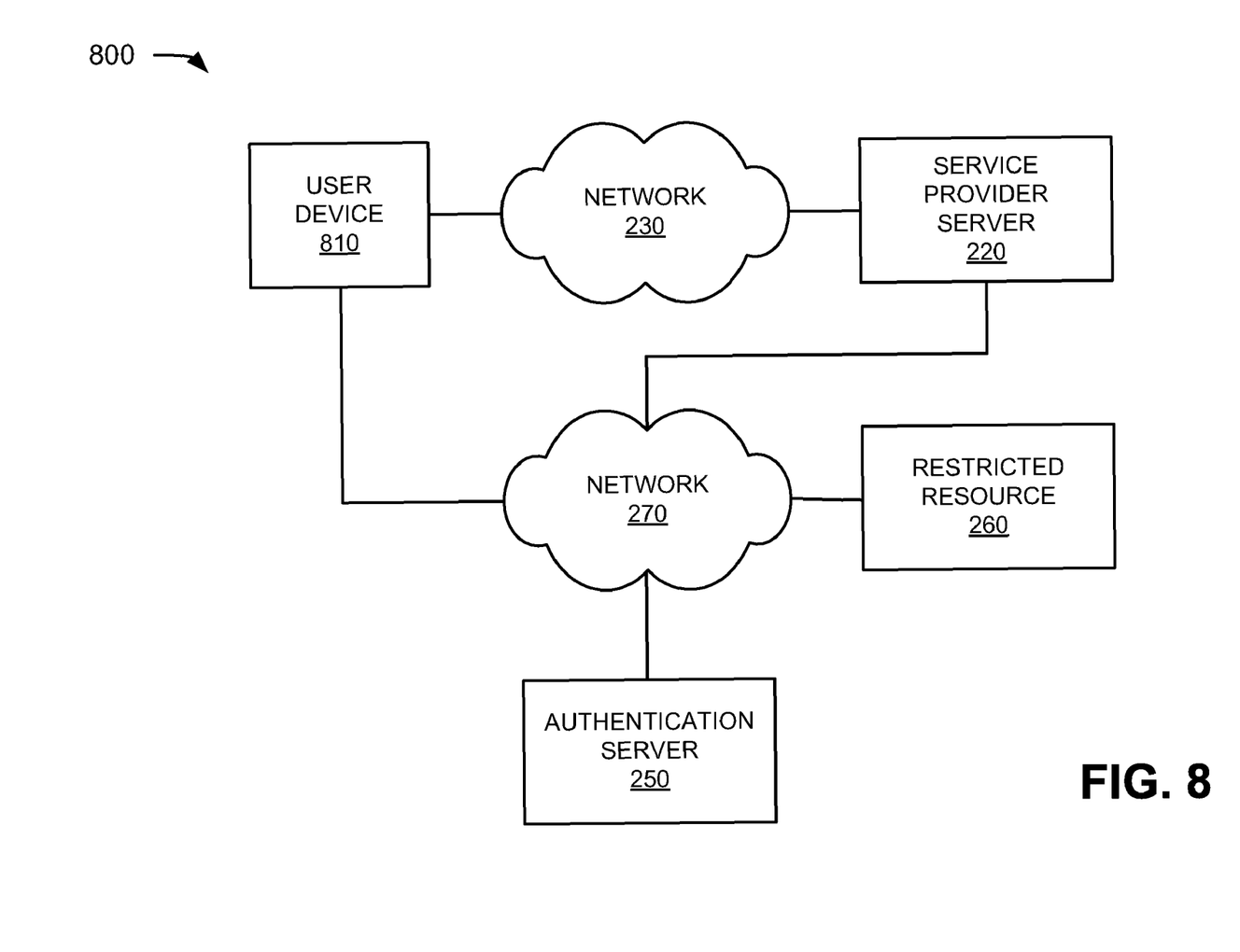
FIG. 8 is an exemplary diagram of yet another network in which systems and methods described herein may be implemented.

FIG. 8 is an exemplary diagram of yet another network 800 in which systems and methods described herein may be implemented. Network 800 may include user device 810 connected to service provider server 220 via network 230, and connected to authentication server 250 and restricted resource 260 via network 270. Service provider server 220, network 230, authentication server 250, restricted resource 260, and network 270 may be configured similar to like elements described with regard to FIG. 2.

User device 810 may include any type of communication or computation device, such as a telephone device similar to telephone device 210, a computer device similar to computer device 240, or a device that combines aspects of a telephone device and a computer device. In network 800, user device 810 may be used to not only receive the access number from service provider server 220, but also to use that access number to access restricted resource 260. In other words, user device 810 may contact service provider server 220 to obtain an access number. User device 810 may subsequently contact authentication server 250 and use the access number to gain access to restricted resource 260. In these implementations, no separate telephone device and computer device may be necessary.

Implementations described herein may provide a secure technique for providing a user with access to a restricted resource.

The foregoing description provides illustration and description, but is not intended to be exhaustive or to limit the invention to the precise form disclosed. Modifications and variations are possible in light of the above teachings or may be acquired from practice of the invention.

For example, while a series of acts has been described with regard to FIG. 4, the order of the acts may be modified in other implementations. Further, non-dependent acts may be performed in parallel.

Also, while it has been described that a user receives the access number from service provider server 220 via a telephone call, this need not be the case. In another implementation, the user may receive the access number via a text message, such as an instant message or another form of reliable, quick communication.

Further, it has been described that access to a restricted resource is obtained via an authentication server. In another implementation, the service provider server may operate as a proxy server for the restricted resource, such that the user can gain access to the restricted resource through the service provider server.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    identifying, by a network device associated with a plurality of companies and based on a telephone call received from a user, information associated with the user, where the information is stored in a memory associated with the network device;
    authenticating, by the network device and based on the identified information, the user;
    determining, by the network device and in response to authenticating the user, that the user is associated with two or more of the plurality of companies, where the network device determines that the user is associated with the two or more of the plurality of companies based on the identified information;
    generating, by the network device, an access number for providing access to one or more restricted resources associated with at least one of the two or more of the plurality of companies; and
    sending the access number to the user and to an authentication server associated with the at least one of the two or more of the plurality of companies in order to regulate access to a restricted resource, of the one or more restricted resources, based on the access number sent to the user and the access number sent to the authentication server.

2. The method of claim 1, where the user places the telephone call using a telephone device, and
    where identifying the information associated with the user includes:
        determining first identifying information associated with the telephone device, and
        determining, based on the first identifying information, second identifying information associated with the user, and
    where authenticating the user is based on the first identifying information and the second identifying information.

3. The method of claim 2, where the determining first identifying information associated with the telephone device includes:
    determining at least one of caller identification (ID) information or International Mobile Subscriber Identity information.

4. The method of claim 2, where the determining second identifying information associated with the user includes:
    receiving, via the telephone device, at least one of a password or biometric data from the user.

5. The method of claim 2, where the generating an access number includes:
    generating a random string of characters, and
    embedding one of the first identifying information or the second identifying information within the random string of characters, as the access number.

6. The method of claim 1, further comprising:
    disconnecting the telephone call without sending the access number to the user when the user is not authenticated.

7. The method of claim 1, where the generating the access number includes:
    generating a random string of characters of a predetermined length as the access number.

8. The method of claim 1, where the generating the access number includes:
    generating, as the access number, a random string of characters of a predetermined length that has an expiration time that indicates when the access number expires.

9. The method of claim 1, where determining that the user is associated with the two or more of the plurality of companies includes:
    identifying a plurality of authentication servers associated with the two or more of the plurality of companies; and
    where the sending the access number includes:
        transmitting the access number to the plurality of authentication servers.

10. A system comprising:
    a service provider server to:
        receive a telephone call from a user, authenticate the user,
determine that the user is associated with a first company and a second company,
request, based on determining that the user is associated with the first company and the second company, the user to select at least one of the first company or the second company,
generate, based on a selection received from the user in response to the request, an access number for accessing at least one of one or more restricted resources, where each one of the one or more restricted resources are associated with at least one of the first company or the second company, and
provide the access number to the user, as a first access number, and to an authentication server corresponding to the at least one of the first company or the second company, as a second access number, in order to regulate access to the at least one of the one or more restricted resources based on the first access number and the second access number.

11. The system of claim 10, where the user places the telephone call using a telephone device; and
where when authenticating the user, the service provider server is to:
determine first identifying information associated with the telephone device,
determine second identifying information associated with the user, and
authenticate the user based on the first identifying information and the second identifying information.

12. The system of claim 11, where the first identifying information includes at least one of caller identification (ID) information or International Mobile Subscriber Identity information.

13. The system of claim 11, where multiple users are associated with the telephone device and the second identifying information includes at least one of a password or biometric data associated with the user, and
where the service provider is further to:
identify the user as one of the multiple users associated with the telephone device.

14. The system of claim 11, where, when generating the access number, the service provider is to:
generate a random string of characters, and
embed one of the first identifying information or the second identifying information within the random string of characters, as the access number.

15. The system of claim 10, where the access number includes a random string of characters of a predetermined length with an expiration time that indicates when the access number expires.

16. The system of claim 10, where the authentication server is to:
receive the first access number from the user,
determine whether the first access number is valid,
compare the first access number and the second access number, and
determine that the user is permitted access to the at least one of the one or more restricted resources when the first access number is valid and the first access number matches the second access number.

17. The system of claim 16, where the access number has an expiration time that indicates when the access number expires, and
where when determining whether the first access number is valid, the authentication server is to:
determine that the first access number is valid when the first access number has not expired.

18. A system, comprising:
a service provider server to:
receive a first access number from a service provider,
receive a second access number from a user, where the second access number was provided to the user from the service provider via a telephone call,
determine whether the second access number is valid,
compare the first access number and the second access number, and
provide, to the user, selective access to a restricted resource based on whether the second access number is valid and a result of the comparison of the first access number and the second access number; and
an authentication server that is different from the service provider server, the authentication server to:
receive the first access number from the service provider,
receive the second access number from the user,
determine whether the second access number is valid,
compare the first access number and the second access number, and
provide, to the user, selective access to another restricted resource based on whether the second access number is valid and another result of the comparison of the first access number and the second access number.

19. The system of claim 18, where the second access number has an expiration time that indicates when the second access number expires, and
where when determining whether the second access number is valid, the authentication server and the service provider server are to:
determine that the second access number is valid when the second access number has not expired.

20. The system of claim 18, where, when providing selective access to the restricted resource, the service provider server is to:
determine that the user is permitted access to the restricted resource when the second access number is valid and the first access number matches the second access number, and
where, providing selective access to the other restricted resource, the second authentication server is to:
determine that the user is permitted access to the other restricted resource when the second access number is valid and the first access number matches the second access number.

21. The system of claim 18, where the service provider server or the authentication is further to:
expire the second access number after providing selective access to the restricted resource or the other restricted resource.

22. The system of claim 18, where the restricted resource is associated with a plurality of legal entities, and
when providing selective access to the restricted resource, the service provider server is to:
send a message to the restricted resource or a device that regulates access to the restricted resource that grants access to the user to the restricted resource when the user is permitted access to the restricted resource.

23. A system comprising:
a first device to:
embed user identifying information within a random string of characters to generate an access number,
provide the access number to a user via a telephone call, the user corresponding to the user identifying information, identify a selected company, of a plurality of companies associated with the user, as being selected by the user, and provide the access number to an authentication server associated with the selected company, where the authentication server regulates access by the user to a restricted resource based on the access number provided to the user and the access number provided to the authentication server.

24. The method of claim 1, where determining that the user is associated with the two or more of the plurality of companies, further comprises:

identifying a selected company, of the two or more of the plurality of companies, as being selected by the user; and where sending the access number to the user and to the authentication server associated with at least one of the two or more of the plurality of companies includes:

sending the access number to an authentication server associated with the selected company of the two or more of the plurality of companies.

25. The system of claim 10, where the at least one of the one or more restricted resources is associated with the first company and the second company.

26. The system of claim 10, where the at least one of the one or more restricted resources is associated with the first company, the second company, and a third company.

* * * * *